United States Patent Office 3,344,148
Patented Sept. 26, 1967

3,344,148
4,4-SUBSTITUTED-1,3-DIOXOLANES AND PREPARING THEM
Heinz J. Dietrich, Bethany, and Joseph V. Karabinos, Orange, Conn., assignors to Olin Mathieson Chemical Corporation
No Drawing. Filed Oct. 29, 1965, Ser. No. 505,751
1 Claim. (Cl. 260—340.9)

This invention relates to certain novel aryl 1,3-dioxolanes and to processes of producing them. The novel aryl 1,3-dioxolanes of this invention are 4-phenyl-4-benzoyl-1,3-dioxolane (I) and 4-phenyl-4-alphahydroxybenzyl-1,3-dioxolane (II) having the formulas

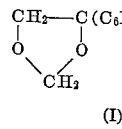  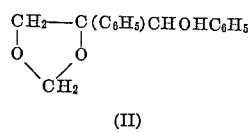

(I)  (II)

The principal object of this invention is to provide these heretofore unknown dioxolanes. Another object is to provide processes for preparing them. Still another object is to provide useful herbicidal compounds.

The 4-phenyl-4-benzoyl-1,3-dioxolane of this invention is prepared by reacting benzoin or alphahydroxymethylbenzoin with formaldehyde in any suitable proportions but preferably in a molar ratio of from 1:1.5 to 1:2 in the presence of a minor amount of an acid catalyst. Water is formed as a byproduct in the reaction and it is advantageously removed continuously. Appropriately the reaction is carried out by refluxing a solution of the reactants in an inert, water-immiscible solvent arranged to trap out the byproduct water. The reaction is essentially complete when no more water forms. Usually from 2 to 12 hours are required, preferably about 8 hours.

As acid catalysts suitable in this process of the invention, protonic acids having a pK constant of 4 or less measured in water at 25° C. are useful, including both inorganic and organic acids. Examples include perchloric acid, hydrochloric acid, sulfuric acid, phosphoric acid, hydrofluoric acid and p-toluenesulfonic acid.

Suitable water-immiscible solvents include hydrocarbons and halohydrocarbons generally having boiling points above about 60° C. and preferably not above about 140° C. Examples include petroleum ether, hexane, benzene, toluene, xylene, carbon tetrachloride and ethylene dichloride.

The formaldehyde used is dry and is suitably in the form of gaseous formaldehyde, paraformaldehyde or trioxane.

The 4-phenyl-4-alphahydroxybenzyl-1,3-dioxolane (II) of this invention is prepared by catalytic hydrogenation of the 4-phenyl-4-benzoyl-1,3-dioxolane (I). Palladium on charcoal is a suitable catalyst but other known hydrogenation catalysts are suitable. Appropriately the starting material is dissolved in a suitable solvent, for example, ethanol, catalyst is added and the hydrogenation is carried out at suitable temperatures, for example, from 0° to 100° C. at atmospheric or higher pressures until hydrogen absorption ceases, usually from less than 1 up to 5 hours. The product, crystallized from petroleum ether or mixtures of petroleum ether-methanol, for example 0.5:1, consists of a mixture of two stereoisomers, one melting at 58° C. (10–20%) and one melting at 72 to 73° C. (80–90%).

Both (I) and (II) showed post-emergence herbicidal activity against weeds and (II) showed soil fungicide activity.

Example I 636 g. (3 moles) of benzoin, 180 g. (6 moles) of paraformaldehyde, 20 g. of p-toluene sulfonic acid and 1500 ml. of toluene were refluxed for 8 hours eliminating water in a Dean-Stark trap. Evaporation of solvent and recrystallization from methanol produced approximately 100 g. (40%) of (I), M.P. 66.8° C.

*Analysis.*—For $C_{16}H_{14}O_3$.—Calc.: 75.59% C; 5.51% H; M.W. 254. Found: 76.16% C; 5.28% H; M.W. 254 (mass spect.); 267 (Osmometer).

(I) was tested as a post-emergence herbicide at a rate of 20 pounds per acre and showed good control of weeds.

Example II (I) was also obtained in 92% of theory by refluxing 1.5 mole alphahydroxymethylbenzoin for 4 hours with 2.5 mole paraformaldehyde and 3 g. p-toluene sulfonic acid in 2500 ml. benzene in a Dean-Stark apparatus.

Example III 3.6 g. (I) and 200 mg. palladium on charcoal in ethanol with approximately 0.4 liter of hydrogen at 25° C. and atmospheric pressure during 3 hours yielded quantitatively a mixture of two stereoisomers of (II), M.P. 58° and 72–73° C. from petroleum ether.

*Analysis.*—For $C_{16}H_{16}O_3$.—Calc.: 75.00% C; 6.25% H. Found: 75.18% C; 6.45% H.

The structure was verified by n.m.r. and by infrared.

(II) was tested as a post-emergence herbicide at a rate of 20 pounds per acre and showed good control of weeds. (II) was also tested as a soil fungicide by the agar plate test and showed good activity.

What is claimed is:

A compound selected from the group consisting of 4-phenyl-4-benzoyl - 1,3 - dioxolane and 4-phenyl-4-alpha-hydroxylbenzyl-1,3-dioxolane.

References Cited

UNITED STATES PATENTS 2,578,861  12/1951  Thomas et al. ____ 260—340.9 X

OTHER REFERENCES

Petrow et al., Chemical Society Journal, pt. 1 (1960), pp. 1048–54.

Lucas, Organic Chemistry, 2nd edition, 1953, American Book Co., New York, N.Y., p. 262.

ALEX MAZEL, *Primary Examiner.*

NICHOLAS S. RIZZO, *Examiner.*

J. H. TURNIPSEED, *Assistant Examiner.*